(12) United States Patent
Smith et al.

(10) Patent No.: US 6,190,775 B1
(45) Date of Patent: Feb. 20, 2001

(54) ENHANCED DIELECTRIC STRENGTH MICA TAPES

(75) Inventors: James D. B. Smith, Monroeville, PA (US); Franklin T. Emery, Fort Payne, AL (US)

(73) Assignee: Siemens Westinghouse Power Corporation, Orlando, FL (US)

( * ) Notice: Under 35 U.S.C. 154(b), the term of this patent shall be extended for 0 days.

(21) Appl. No.: 09/512,152

(22) Filed: Feb. 24, 2000

(51) Int. Cl.$^7$ .................................................... B32B 5/16
(52) U.S. Cl. .................... 428/417; 428/324; 428/363; 428/377; 428/413
(58) Field of Search ............................. 428/413, 414, 428/415, 417, 363, 377, 324; 524/450, 445; 174/121 AR; 427/331, 372.2

(56) References Cited

U.S. PATENT DOCUMENTS

| | | |
|---|---|---|
| 4,112,183 | 9/1978 | Smith . |
| 4,254,351 | 3/1981 | Smith et al. . |
| 4,576,856 * | 3/1986 | Kuwajima et al. .................. 428/241 |
| 4,889,885 | 12/1989 | Usuki et al. . |
| 5,698,624 | 12/1997 | Beall et al. . |
| 5,721,306 | 2/1998 | Tsipursky et al. . |
| 5,760,121 | 6/1998 | Beall et al. . |
| 5,804,613 | 9/1998 | Beall et al. . |
| 5,904,984 | 5/1999 | Smith et al. . |
| 6,103,382 * | 8/2000 | Smith et al. .......................... 428/417 |

OTHER PUBLICATIONS

Rose, A. et al., *The Condensed Chemical Dictionary*, 6$^{th}$ ed., 1961, pp. 752 and 909–911, Rheinhold Publishing, New York, NY.

Drljaca, A. et al., "Intercalation of Montmorillonite with Individual Chromium (III) Hydrolytic Oligomers", *Inorganic Chemistry*, 1992, pp. 4894–4897, vol. 31, No. 23, American Chemical Society.

Yano, K. et al., "Synthesis and Properties of Polymide–Clay Hybrid", *Journal of Polymer Science*, Part A: Polymer Chemistry, 1993, pp. 2493–2498, vol. 31, John Wiley & Sons, Inc.

Bjorklund, A. et al., "A New Mica–free Turn Insulation for Rotating HV Machines", *Conference Record of the 1994 IEEE International Symposium on Electrical Insulation*, Jun. 1994, pp. 482–484.

Drljaca, A. et al., "A New Method for Generating Chromium (III) Intercalated Clays", *Inorganica Chimica Acta*, 1997, pp. 151–154, vol. 256, Elsevier Science S.A.

Miller, B., "Tiny Clay Particles Pack Potent Properties Punch", *Plastics World*, Oct. 1997, pp. 36–38.

* cited by examiner

*Primary Examiner*—William Krynski
*Assistant Examiner*—J. M. Gray
(74) *Attorney, Agent, or Firm*—Eckert Seamans Cherin & Mellott, LLC

(57) ABSTRACT

A flexible insulating tape (16) contains a flexible backing (18) and a mica or mica-like silicate matrix (20) with insulating resin (17) and intercalated metal ions (12) between the matrix (2) where the resin (17) and the ions (12) are intimately disposed next to the mica (20).

14 Claims, 2 Drawing Sheets

ENHANCED DIELECTRIC STRENGTH MICA TAPES

BACKGROUND OF THE INVENTION

Field of the Invention

The invention relates to enhanced dielectric strength capability mica tapes which utilize impregnated epoxy resins, and epoxy chromium, epoxy tin and epoxy zinc ionic bonding within chromium, tin and zinc intercalated potassium-based mica flake substrates, to provide high voltage mica tapes. These mica tape substrates can be used for a wide variety of insulation applications for generator stators and rotors. The high dielectric strength will allow its use as a very thin insulation substrate.

BACKGROUND INFORMATION

Mica, commercially considered as a group of hydroxyl containing potassium aluminum silicates, such as $KAl_2AlSi_3O_{10}(OH)_2$ (muscovite) or $KMg_3AlSi_3O_{10}(OH)_2$ (phlogopite), *The Condensed Chemical Dictionary*, 6$^{th}$ Ed., Rheinhold Publishing, 1961, p. 752, has been long been a key component of high voltage electrical ground insulation in electrical machines over 7 Kv, because of its particularly high dielectric strength, low dielectric loss, high resistivity, excellent thermal stability and excellent corona resistance. Presently, mica is used in the form of large splittings or flakes bonded to a flexible, pliable polyethylene glycol terephthalate mat or a glass fabric to provide an insulating substrate in itself, having the mechanical integrity required for machine wrapping of coils, as shown for example in U.S. Pat. Nos. 4,112,183 and 4,254,351 (Smith and Smith et al.), respectively. In many cases, mica flake tape is wrapped around the coil and then impregnated with low viscosity liquid insulation resin by vacuum-pressure impregnation ("VPI"). That process consists of evacuating a chamber containing the coil in order to remove air and moisture trapped in the mica flake tape, then introducing the resin under pressure to impregnate the mica flake tape completely with resin eliminating voids, producing resinous insulation in a mica flake matrix. This resin is subsequently cured during the heating cycle. In practice, complete elimination of voids is difficult, and even though the mica flake tape is thick, bulky, and difficult to apply to the coils, it has remained the ultimate standard in the industry.

Problems with mica as presently used in ground insulation occur in two areas: (1) microscopically, at the interface between the mica and polymeric insulation, and (2) in the VPI process required to fill the mica tape layers completely with polymeric insulation. The mica surface is a problem area because it is not "wet" very well by the insulation resin. Thus, there is a tendency for voids to form at the mica surface that are not completely eliminated during evacuation of the coil prior to impregnation with the insulation resin. Surface treatments of the mica or addition of wetting agents to the resin have not completely eliminated this problem to date. These voids can have significant consequences for both the electrical performance of the coil and its mechanical integrity. Electrically the voids can act as locations for partial discharges. Mechanically the voids can be places where delamination can begin, causing potential disintegration of the coil.

Recently, the requirement of even using mica for high voltage insulation has been questioned. Bjorklund et al., of ABB, in "A New Mica-Free Turn Insulation For Rotating HV Machines," the *Conference Record of the* 1994 *IEEE International Symposium on Electrical Insulation*, Jun. 5–8, 1994 pp. 482–484, taught use of a chromium oxide protective layer for a resin enamel as copper turn insulation, which was thin and easily manufactured, as a substitute for aramid paper containing 50% mica flake. The nonlinearity of the chromium oxide apparently has a large impact on the absorption of free electron charges.

Others had previously experimented with highly positive charged materials having good thermal stability. Drljaca et al. in "Intercalation of Montmorillonite with Individual Chromium (III) Hydrolytic Oligomers", *Inorganic Chemistry*, vol. 31, no. 23, 1992, pp. 4894–4897, taught chromium inserted/intercalated pillared clays as having sorptive and catalytic properties and possible substitutes for zeolites, that is, sodium or calcium aluminosilicates used for ion exchange water softening. Drljaca et al. further described, in "A New Method for Generating Chromium (III) Intercalated Clays," *Inorganica Chimica Acta*, 256, 1997, pp. 151–154, Cr (III) dimer reaction with other dimer units to form planar sheets for intercalation into montmorillonite clays, $Al_2O_3.4SiO_2.H_2O$ In a different area, though still related to clays, Miller, in "Tiny Clay Particles Pack Patent Properties Punch," *Plastics World*, Fillers, October 1997, pp. 36–38, described mineral filled plastic nanocomposites having excellent mechanical strength, heat resistance, flame retardancy and gas-barrier properties. These composites originally used nylon materials containing bundles of small platelets of montmorillonite clay, about 0.5 micrometer to 2 micrometers wide and 1 nanometer (nm) thick, that is, 0.001 micrometer thick, for automobile timing belts. More recently, attempts have been made to incorporate such platelets into other resins. Miller further describes the platelets as having a high "aspect ratio," that is, high width compared to thickness, where molecular bonds are formed between the platelets and a polymer during compounding. The clay producers, such as Nancor Inc. and AMCOL Intl., chemically stretch, that is, "open" the spacing between the platelets from about 4 Angstrom Units, about 0.0004 micrometer, to a thickness such that organic resin molecules can directly ionically or covalently attach to the platelet surface, allowing the platelet to directly react into the polymer structure during subsequent polymerization/compounding. The platelet bundles are also exfoliated into individual platelets by the clay producers to aid in polymerization/compounding. The molecular "tail", Miller states, has the chemical functionality to overcome the incompatibility between the hydrophilic (having an affinity for water) clay and the hydrophobic (water-repelling) organic polymer and enable them to directly form a molecular bond, that is, directly intercalate the polymer into the nanoclay. Besides timing belts, additional uses appear to be thermoplastic resin gas barrier packaging, microwavable containers, and epoxy resin circuit boards.

These processes are also generally described by Usuki et al., of Toyota Chou, in U.S. Pat. No. 4,889,885. There, onium ions, from materials such as ammonium salts, sulfonium salts and phosphonium salts, were used to expand the interlayer distance of a clay such as montmorillonite through ion exchange with inorganic ions in the clay mineral. This permits the clay mineral to take a polymer into the interlayer space and connects the layers of clay mineral and polymer directly to each other through ionic bonds. The onium salt has a molecular skeleton which becomes the polymerization initiator. In cases where the onium salt has a molecular skeleton which becomes the basic constituting unit of the resin, the salt will have a phenol group (for phenolic resin), an epoxy group (for epoxy resin) and a polybutadiene group (for acrylonitrilebutadiene rubber). Yano and Usuki et al. of Toyota R&D, in "Synthesis and Properties of Polyamide—Clay Hybrid", *Journal of Polymer Science*, Part A, Polymer Chemistry, vol. 31, 1993, pp. 2493–2498, describe use of montmorillonite clay intercalated with an ammonium salt of dodecylamine as an aligned filler in a polyamide resin hybrid, for use as a gas barrier film. There, it appears a sodium type montmorillonite was mixed with hot water to disperse the sodium, which was then replaced with the ammonium salt of dodecylamine which then interacted with dimethylacetamide ("DMAC") to "open" the platelets of montmorillonite. The intercalated montmorillonite was then simply dispersed into a polyamide matrix and cast as a film, where the montmorillonite oriented parallel to the film surface to provide barriers to gas permeation.

The exfoliation and polymer intercalation of platelet bundles is also described in U.S. Pat. No. 5,698,624 (Beall et al.), where polymerizable monomers were directly intercalated between platelets or admixed with exfoliated material and then polymerized. Suitable polymers taught are polyamides, polyesters, polyurethanes and polyepoxides among others. Here organic ammonium molecules were inserted into sodium or calcium montmorillonite clay platelets to increase the thickness within the platelets, "open", followed by high shear mixing to exfoliate the silicate layers which were then directly mixed with a matrix polymer to improve mechanical strength and/or high temperature characteristics. All instances of polymer interaction with the platelets appear to be direct interaction between the polymer and the "opened" nanoplatelet. Other patents in this area include U.S. Pat. Nos. 5,721,306; 5,760,121; and 5,804,613 (Tsipursky et al.; Beall et al.; and Beall et al. respectively).

Following the trend to eliminate bulky mica flake tape because of its bulkiness, and difficulty of resin wetting, U.S. patent application Ser. No. 09/320,202 (RDM 98-001; ESCM 283139-00192; Smith and Emery), filed on May 26, 1999, taught interacting an oligomer, containing Cr, Sn or Zn, which had been inserted (intercalated) into spaces within platelets of an Al.Si.O based material, with a resin such as an epoxy which polymerizes in the presence of Cr, Sn or Zn to form a resinous admixture, where the platelets constituted about 3 wt % to 35 wt % of the resinous admixture. This resinous admixture was coated directly on metal conductors, etc., eliminating use of mica tape or other mica based insulating substrates. While montmorillonite clay ($Al_2O_3.4SiO_2.H_2O$) was the prime Al.S1.$O_2$ material used, mica silicates were mentioned for use as the platelets - essentially filler in the resin admixture. However, inserting Cr, Sn or Zn into potassium based Al.Si.O materials (mica) proved difficult, so that clay based platelets proved to be preferred.

While resins containing metal intercalated montmorillonite clay are extremely useful as casting/dipping resins, there remains a need to merge intercalation technology with mica technology in a way to reduce the bulkiness of mica tapes and solve mica wetting problems associated with mica tapes.

SUMMARY OF THE INVENTION

Therefore, it is a main object of this invention to provide an improved low cost, high voltage impregnated mica flake or mica tape electrical insulation that can be applied in thin cross-sections while still providing high voltage protection and having high voltage endurance.

It is a further object of this invention to provide a low cost, high voltage electrical insulation that has a dramatic improvement in voltage endurance, and so can be applied in thin cross-sections.

It is a further object of this invention to provide a low cost high voltage electrical insulation that can be applied in thin cross-sections while still utilizing some of the advantages of tin and chromium compounds as evidenced by the Smith '183 patent and chromium and zinc compounds as evidenced by the Smith et al '351 patent.

These and other objects of the invention are accomplished by providing, a flexible electrically insulated mica tape, comprising a flexible backing, and a mica matrix structure bonded to the backing, where the mica tape also contains intercalated metal ions selected from the group consisting of Cr, Sn, Zn and mixtures thereof where resin and intercalated metal ions are intimately disposed adjacent to the mica matrix structure. The mica tape can be 0.06 cm to 0.3 cm thick, preferably the mica tape is from 0.005 cm to 0.3 cm thick, and is wound onto a conductor, where the conductor can be a metal coil for dynamoelectric machinery, such as 7 Kv or higher electrical generators. Mica-like silicates, such as kaolinite, can be substituted for all or part of the strictly mica matrix. Additional platelets of nanoclay intercalated with at least one of Cr, Sn or Zn can be added to the mica-resin mixture, up to 50 wt. % based on mica weight, to further enhance electric properties.

The invention also resides in a method of making a flexible electrically insulating mica tape suitable for use as an electrical insulation, comprising the steps of: providing a mixture of mica, liquid resin and ions selected from the group consisting of Cr, Sn, Zn and mixtures thereof; applying the mixture to a backing so that a mica matrix forms on and bonds to the backing where the resin and metal ions are intimately disposed adjacent to the mica; wrapping the mica tape around an electrical conductor; and curing the resin.

Particularly useful resins for impregnating the mica matrix are solventless polyepoxide (epoxy) resins, styrenated polyepoxide resins, polyester resins, and 1,2-polybutadiene resins, all of which can interact and polymerize in the catalytic presence of Cr, Sn and Zn. The voltage endurance of these mica insulating members, when used as a winding tape, are greater than 1000 hours at 7.5 Kv/mm (188 volts/mil), and generally within the much higher range of 2800–3000 hrs. at 188 volts/mil. The normal range of, for example, unfilled epoxy resin is 1000 hrs at 188 volts/mil, thus the winding tapes of this invention can be applied in thicknesses below 0.063 cm (0.025 inch) for voltages up to 35 Kv.

BRIEF DESCRIPTION OF THE DRAWINGS

These and other advantages of the invention will become apparent from the following description in view of the drawings.

DESCRIPTION OF THE PREFERRED EMBODIMENTS

Figure 1:
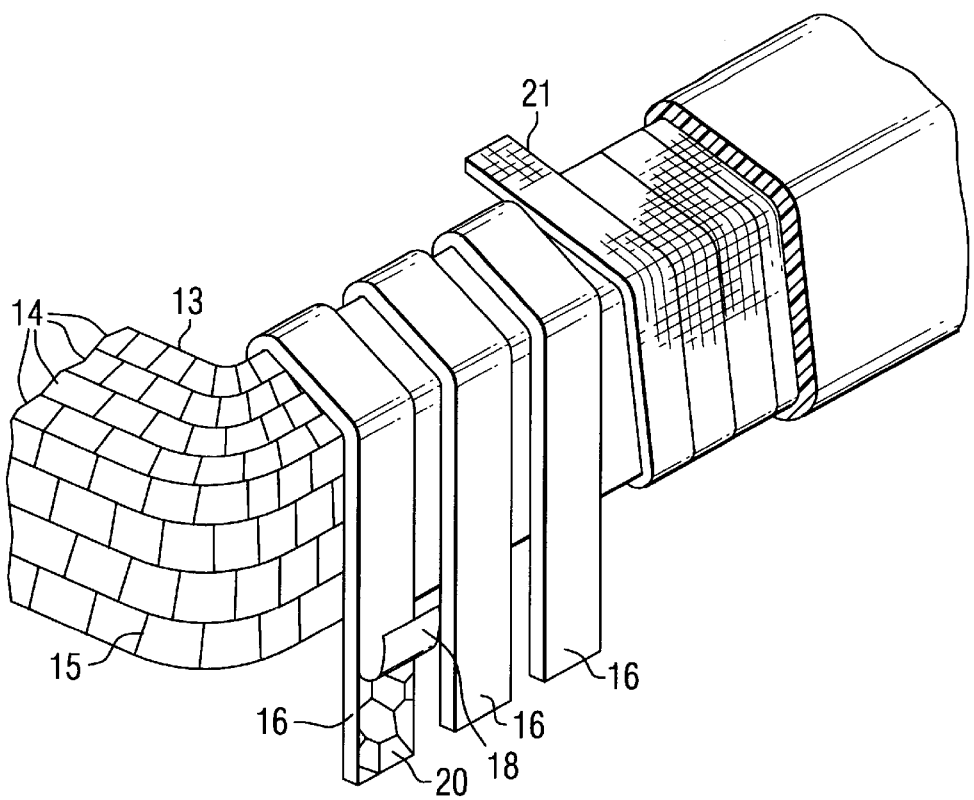
FIG. 1 shows a wrapped, resin impregnated mica tape 16, wound around a coil.

Referring now to FIG. 1 of the drawings, there is illustrated a coil 13, comprising a plurality of turns of conductors 14. Each turn of the conductor 14 consists essentially of a conductor, such as a copper bar or wire wrapped with turn insulation 15. The turn insulation 15 preferably is prepared from a fibrous sheet or strip impregnated with a bonding resinous insulation. While the bonding resinous insulation may consist solely of a coating of uncured varnish or resin, it is preferred that it comprise a wrapping of fibrous material treated with a bonding resin. Glass fiber cloth, paper cloth of the like treated with a resin may be used with equally satisfactory results. The resin applied to the turn insulations to bond them together may be a phenolic resin, an alkyd resin, a melamine resin or the like, or mixtures of any two or more of these.

The turn insulation is not adequate to withstand the severe voltage gradients that will be present between the conductor and ground when the coil is installed in a high-voltage generator. Therefore, ground insulation for the coil is provided by wrapping one or more layers of mica tape 16 about the turn 14. The mica tape of this invention would be tape 16. Such composite tape 16 may be a paper or felt of laid down small mica flakes or may comprise a pliable backing sheet 18 of, for example, glass fiber cloth or polyethylene glycol terephthalate mat, having a layer of mica, usually in the form of flakes 20, bonded thereto by a liquid resinous binder. The tape may be applied half lapped, abutted or otherwise. Generally, a plurality of layers of the composite tape 16 are wrapped about the coil depending upon voltage requirements. To impart better abrasion resistance and to secure a tighter insulation, a wrapping of an outer tape 21 of a tough fibrous material, for example, glass fiber, or the like is applied to the coil.

Preferably the mica flakes themselves are "strictly mica" structures, selected from muscovite, $KAl_2AlSi_3O_{10}(OH_2)$, or phlogopite, $KMg_3AlSi_3O_{10}(OH)_2$, or mixtures of the two, which will be intercalated with at least one of Cr, Sn and Zn metal ions during the paper laying or paper felting process or during bonding to the backing sheet. Mica is unique amongst materials in having a high resistance to partial discharges thereby increasing the voltage endurance and prolonging the life of insulation materials. It is now generally believed that the mechanism responsible for this protective behavior is electronic in nature and not physical. The high energy electrons resulting from partial discharges (sometimes referred to as "electron avalanches") are slowed down and de-energized by the strong positive fields generated by the arrays of $K^+$ions held within the silicate lattice galleries. It is this effect which is apparently primarily responsible for the protective nature of mica in high voltage insulation systems.

As will become clear later in this patent application, the concepts and technical approaches pursued here build upon this electron deactivation mechanism. One mechanism by which mica is effective at scavenging free electrons is the presence of $K^+$ions in the lattice galleries. These ions are typically held very tightly and are very effective scavengers of free electrons.

Typically the transition metal ions have higher charge and smaller size, thus having a much higher charge/size ratio. The concept is that replacing $K^+$ions in these lattice galleries with Cr, Sn or Zn cations will give insulation materials with even more effective partial discharge protection (and hence longer voltage endurance) than is found with mica alone. This is because the higher charge/radius ratio of these metal ions will give more efficient de-energizing of the fast electrons which are responsible for damaging insulation materials.

In addition to strictly mica structures described earlier, for certain applications, similar structures, defined here as "mica-like silicates", can be used as partial or complete substitutes for the strictly mica structures (such as muscovite or phlogopite). Examples of mica-like silicates include kaolinite, $Al_2O_3.2SiO_2.2H_2O$, halloysite, $Al_2O_3.3SiO_2.2H_2O$, and chlorite $(Mg, Fe, Al)_6(Si, Al)_4O_{10}(OH)_8$. Thus, the mica matrix can comprise or contain these mica-like silicates from 0% to 100%. An all strictly mica structure is preferred, however, because of its lower cost.

Figure 2:
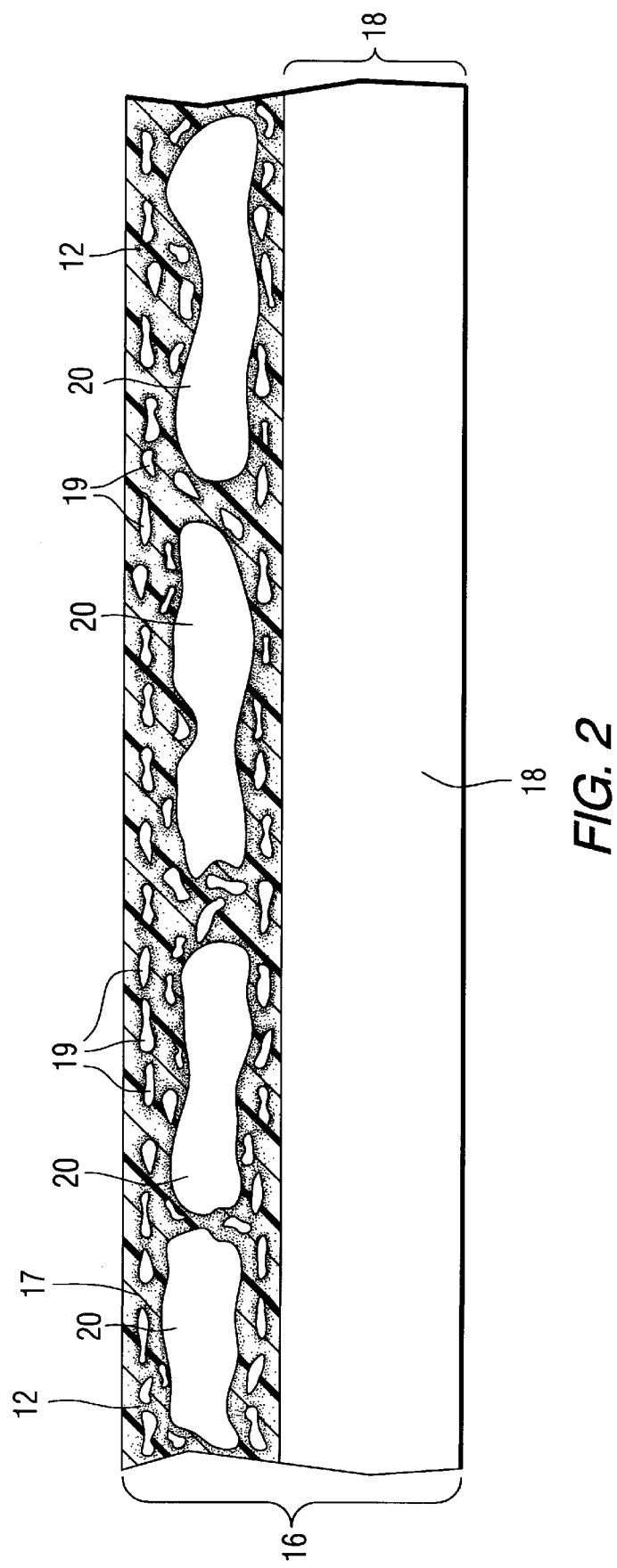
FIG. 2, which best shows the invention, is an idealized cross-section of the mica tape of this invention.

Optionally Cr, Sn, Zn intercalated nanoclays, up to 60 wt. %, with a very useful range being 20 wt. % to 50 wt. %, based on weight of the mica, can be added to the mica. The nanoclays are usually much smaller than the mica flakes and can be disposed around and between them, as shown in FIG. 2. One aspect of this invention is to use select metal intercalated nanoclays with the conventional mica tape materials to give new substructures within the mica layers that would permit better mixing of the VPI resin within the composite layers. The desired goal would be to create, within the mica layers areas of nanocomposite structures where the VPI resin is intercalated within the nanoclay layers to give intimate molecular dispersion of organic/ inorganic phases. In addition, the presence of intercalated metals (at least one of Cr, Sn, or Zn) provides for additional catalytic cure of the epoxy VPI resin to give improved electrical, mechanical, tensile and thermal capability.

In this embodiment select metal intercalated nanoclays can be added to the mica flakes during the initial manufacture of the mica paper to give an intimate dispersion of these nano-size clay, particles with the larger mica flakes. The nanoclay can be added as an aqueous emulsion to the mica paper fabrication process. Since this paper process is already an aqueous-based process, this nanoclay emulsion would be a convenient procedure to admix the intercalated material with the mica flakes. Conversely, the intercalated nanoclay can be added to the mica paper as an organic solution, along with a bonding resin (for example, epoxy), to give a "mica bond" composition which is able to impregnate between the mica flakes. In both instances, the presence of an intercalated metal accelerator (at least one of Cr, Sn or Zn) within the mica layers would be expected to enhance the tensile, mechanical and heat distortion temperature (HDT) of the VPI resin used to impregnate the mica tape. The overall benefits of these improved properties would permit the groundwall insulation thickness to be reduced (by as much as 25% or more) resulting in improved heat transfer in generator coils and more compact designs. A useful nanoclay for these applications is, for example a Al.Si.O material, preferably montmorillonite $(Al_2O_3.4SiO_2.H_2O)$.

Figure 3:
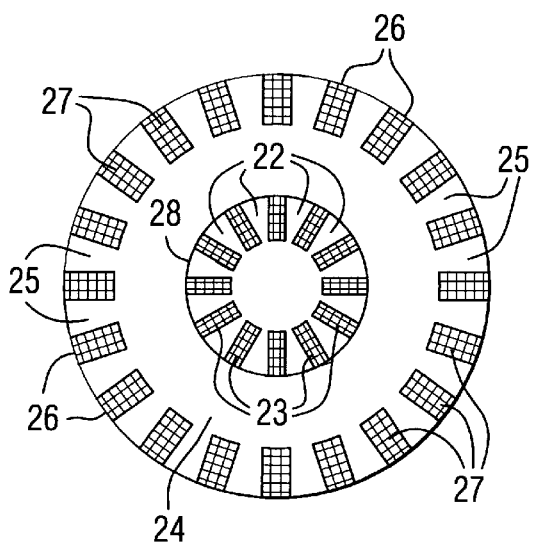
FIG. 3 is an idealized cross-sectional view of a motor, containing coils insulated with a wrapping of the mica tape insulation of this invention.
Figure 4:
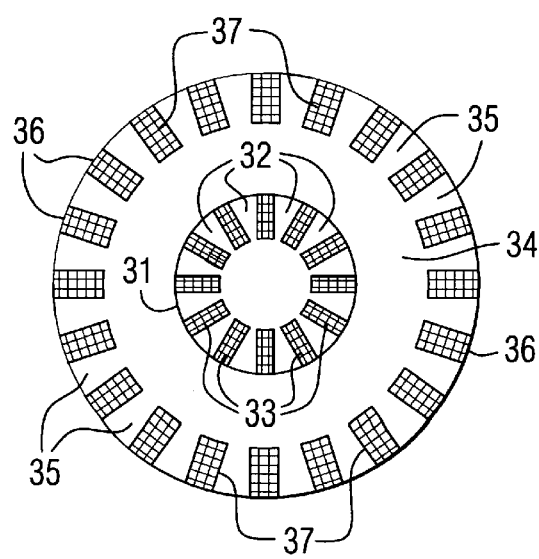
FIG. 4 is a cross-sectional view of generator, containing coils insulated with a wrapping of the mica tape insulation of this invention.

Referring now to FIG. 2, an idealized flexible mica tape 16 with flexible glass fiber backing 18 is shown supporting a mica 20 matrix structure containing insulating resin 17, with homogeneously disposed metal intercalated nanoclay platelets 19, and with intercalated metal ions shown generally as dots 12. FIG. 3 shows one embodiment of a motor in cross section. The motor comprises a metal armature 28 having slots 22 therein, containing insulated coils 23, surrounded by a metal stator 24 having slots 25 therein about the stator circumference at 26. The stator slots contain insulated coils 27. All the insulation coated on the coil substrates 23 and 27 can compose the resinous compositions of this invention. FIG. 4 shows one embodiment of a generator in cross section. The generator comprises substrate components such as a metal rotor 31 having slots 32 therein, containing insulated coils 33, surrounded by a metal stator 34 having slots 35 therein about the stator circumference at 36. The stator slots contain insulated coils 37 and may also contain inner cooling channels not shown. All the insulation coated on the coils 33 and 37 can comprise the resinous compositions of this invention.

One type of resinous composition that can be used as the impregnating insulating resin in this invention is obtainable by reacting epichlorohydrin with a dihydric phenol in an alkaline medium at about 50 C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, providing a diglycidyl ether of bisphenol A type epoxide or a diglycidyl ether of bisphenol F type epoxide. The bisphenol epoxides used in the invention have a 1, 2-epoxy equivalency greater than one. They will generally be diepoxides. By the epoxy equivalency, reference is made to the average number of 1, 2-epoxy groups contained in the average molecule of the glycidylether.

Other glycidylether resins that are useful in this invention include polyglycidyl ethers of a novolac prepared by reacting an epihalohydrin with an aldehyde, for example a phenol formaldehyde condensate. Cycloalphatic type epoxies are also useful, as are glycidyl ester epoxy resins, both being non-glycidyl ether epoxides, all of which are well known in the art and described in detail by Smith et al, in U.S. Pat. No. 4,254,351, where epoxidized polybutadiene, also useful in this invention, is described. Also useful are epoxy resins based on Liquid Crystal Thermoset (LCT) structures. Examples of these types of epoxies are given in U.S. Pat. No. 5,904,984 (Smith et al.). All of these previously described resinous compositions will be hereafter defined and described as "polyepoxide resins".

Other useful resins include polyesters, and 1–2, polybutadienes, all of which are well known in the art. Generally, polyester resins are a large group of synthetic resins, almost all produced by reaction of dibasic acids with dihydric alcohols. In a few cases trifunctional monomers such as glycerol or citric acid are used. The term "polyester resin" applies especially to the products made from unsaturated dibasic acids such as maleic acid. Unsaturated polyester resins can be further polymerized through cross linking. Often, another unsaturated monomer such as styrene is added during this second stage of the polymerization, which can occur at ordinary temperature with suitable peroxide catalysts. Maleic anhydride and fumaric acid are the usual unsaturated acid components, while phthalic anhydride, or adipic or azelaic acid are the corresponding saturated materials. Commonly used glycols are ethylene, propylene, diethylene, dipropylene, and certain butylene glycols. The added polymerizable monomer is styrene, vinyltoluene, diallyl phthalate or methyl methacrylate. In addition to the unsaturated polyester resins, there are other important types. One large group are the alkyd resins. These are made from saturated acid and alcohol monomers with many types of modifications, usually the inclusion of an unsaturated fatty acid. Further, brief descriptions of these resins can be found in Rose, *The Condensed Chemical Dictionary*, 6$^{th}$ ed., pp. 909–911 (1961).

Useful oligomers which may be utilized to contain the Cr, Sn or Zn and their mixtures can be of a dimer structure. These oligomers can also be in other well known structures, for example the trimer, open tetramer, and closed tetramer structures, as set forth in great detail by Drljaca et al. in *InorQanic Chemistry*. vol. 31, no. 23, pp. 4894–4897 (1992) where M=Cr. Usually, an oligomer is prepared containing Cr, Sn, Zn or their mixtures. This can be accomplished, generally, by the reaction of a strong acid (that is, perchloric acid) with a metal salt (chromium nitrate, tin chloride dihydrate, zinc nitrate hydrate) in aqueous solution. Other particularly useful oligomers are metal 2,4-pentanedionates, such as Cr (III) 2,4-pentandionate, which can be readily applied to nanoclay structures using non-aqueous organic solvents, such as methyl ethyl ketone (MEK) or ethyl alcohol. These oligomers can, optimally, be reacted with each other to form dimer chains in the form of planar sheets about 0.0004 to 0.0009 micrometers (4 to 9 Angstrom Units) thick, as is well known and taught by Drljaca et al. in *Inorganica Chimica Acta*, 256 (1997) pp. 151–154.

A solid Al.Si.O based material having a platelet form and having spaces between their constituent platelets, capable of being expanded, such as unmodified muscovite mica, phlogopite mica or clay type silicates such as montmorillonite, or their mixtures, can be treated to intercalate, that is expand or further "open", spacing between constituent platelets. As a usual pre-step, these mica or clay platelets can be chemically treated by contact with amines, onium salts, such as ammonium salts, or other chemicals added in amounts effective to expand the interlayer distance or sprang of the mica or clay and help to make those materials less hydrophilic and more hydrophobic so that the generally hydrophobic polymer materials can more easily interact with the mica or clay.

Then the metal containing oligomer is inserted or disposed within, that is, intercalated into opened Al Si O based material for example muscovite $KAl_2AlSi_3O_{10}(OH)_2$, phlogopite $KMg_3AlSi_3O_{10}(OH)_2$ or montmorillonite $Al_2$ $O_3$ $4SiO_2$ $H_2O$. This is carried out, in one method, by dissolving the metal containing oligomer in a suitable solvent, for example a ketone Chromium(III) 2,4-pentanedionate and then contacting the Al Si $O_2$ based material with the solution for an effective time, followed by drying.

The metal containing oligomer, now disposed within the "opened" Al.Si.O material, is then interacted with a suitable resinous composition which can polymerize with itself and also with the metal containing oligomer disposed within the Al Si 0 material. The intercalated mica, clay or the like, is mixed with a suitable resinous composition. The range of Al Si $O_2$ to resin is from about 3 wt. % to 35 wt. %, preferably 5 wt. % to 20 wt. %, in order to be able to impregnate the mica tape. Upon heating, the resinous composition, which would have been impregnated into the mica insulating member, will chain cross link to form polymers around and within the Al.Si.O material.

The resulting composition can be impregnated to the mica paper or mica tape which can then be wound around an electrical member, for example, a wire, or coil, an electronic component or the like. The insulating effect would be extraordinary and will be such that it can be applied in windings as thin as 0.06 cm. When fully developed, these new dielectric tapes could be used to drastically reduce the groundwall thicknesses dramatically beyond the present levels. Ultimately an insulation system, that is, 0.005 cm (0.002 inch) thickness, for generator coils could quite possibly be the outcome of this development. The very high dielectric capability of these tapes would allow this extremely thin insulation layer to be used.

The invention will now be further illustrated by way of the following example.

EXAMPLE 1

Preparation of Metal Cation Intercalated Nanoclays

Metal cation intercalated nanoclays were prepared by dissolving the metal oligomer in a solvent, such as MEK, and then adding the nanoclay powder and stirring about twelve hours. Typical amounts of ingredients were as follows:

| | |
|---|---|
| Metal Oligomer | 8 g. |
| Methy Ethyl Ketone (MEK) | 400 g. |
| Nanoclay Powder | 40 g. |

The resulting solution, after stirring, was filtered and the resulting metal cation intercalated nanoclay product was dried under vacuum at 60° C. Table 1 gives details of three of the nanoclay products made by this procedure. In the case of the zinc intercalated product (that is, nanoclay "G"), butyl cellosolve was used in place of MEK because of improved solubility.

TABLE 1

Nanoclay Preparation

| Clay Additive Identity | Metal Oligomer | Intercalated Metal Cation |
|---|---|---|
| Nanoclay "D" | Di-n-Butyl bis (2,4-pentanedionate) Tin | $Sn^{4+}$ |
| Nanoclay "E" | Chromium (III) 2,4-pentanedionate | $Cr^{3+}$ |
| Nanoclay "G" | Zinc (II) 2,4-pentanedionate hydrate | $Zn^{2+}$ |

Preparation of Mica Tape Samples

Mica bond compositions were prepared as shown by the three examples in Table 2.

TABLE 2

Improved Mica Tape Resin Compositions

| | |
|---|---|
| Example 1 | |
| DER 661* | 80 parts |
| DER 332* | 20 parts |
| Nanoclay "D" | 7.5 parts |
| MEK | 150 parts |
| Toluene | 150 parts |
| Example 2 | |
| DER 661* | 80 parts |
| DER 332* | 20 parts |
| Nanoclay "E" | 7.5 parts |
| MEK | 150 parts |
| Toluene | 150 parts |
| Example 3 | |
| DER 661* | 80 parts |
| DER 332* | 20 parts |
| Nanoclay "G" | 7.5 parts |
| MEK | 150 parts |
| Toluene | 150 parts |

*Bisphenol 'A' epoxy resins from Dow Chemical

The epoxy resins used (DER 661 and DER 332) are bisphenol 'A' resins readily commercially available from Dow Chemical Co.

Mica sheet samples 21.6 cm×27.9 cm (8.5 in.×11 in.) were prepared by applying a weighed amount of resin solution to a stack of mica sheet and glass cloth. Typically, a sheet of glass fabric and a sheet of mica paper were place on a top loading balance. The mica bond solutions, shown in Table 2, were them added to the mica paper in drops until the added weight reached the desired resin content in the finished substrate, based on the solids content of the mica bond solution. The quantities were chosen to give resin contents of 5%, 10% or 15% (by weight) in the finished mica tape. After drying in air for 10 minutes to 15 minutes, additional solvent was removed at 150° C. for 6 minutes. The mica sheet samples were them checked for flexibility and windability around copper conductors.

Mica tapes prepared as described above would be expected to exhibit enhanced dielectric strength properties shown by at least 23% improvement in their short-term breakdown voltage property and greater than 200% improvement in their long-term voltage endurance property.

While specific embodiments of the invention have been described in detail, it will be appreciated by those skilled in the art that various modifications and alternatives could be developed in light of the overall teaching of the disclosure. Accordingly, the particular arrangement disclosed are meant to be illustrative only and not limiting as to the scope of the invention, which is to be given the full breadth of the claims appended and any and all equivalents thereof.

What is claimed is:

1. A flexible electrically insulating mica tape, comprising a flexible backing and a mica matrix structure bonded to the backing, where the mica tape also contains insulating resin and intercalated metal ions selected from the group consisting of Cr, Sn, Zn and mixtures thereof, where resin and metal ions are intimately disposed around and within the mica matrix structure.

2. The mica tape of claim 1, wherein the resin is selected from the group consisting of polyepoxide resins, styrenated polyepoxide resins, polyamides, polyester resins and 1,2-polybutadiene resins.

3. The mica tape of claim 1, having a voltage endurance greater than about 1000 hours at 7.5 Kv/mm (188 volts/mil).

4. The mica tape of claim 1, having a thickness of from about 0.005 cm to about 0.3 cm, where the mica matrix comprises mica silicates or chlorites.

5. The mica tape of claim 1, wherein the mica, is in the form of flakes, and is selected from the group consisting of muscovite, phlogopite and mixtures thereof, said mica being in platelet form intercalated with the metal ions, and said tape having a thickness of from about 0.06 cm to 0.3 cm.

6. The mica tape of claim 1, further comprising nanoclay platelets intercalated with metal ions selected from the group consisting of Cr, Sn, Zn and mixtures thereof intimately disposed around and within the mica.

7. The mica tape of claim 1, further comprising montmorillonite nanoclay platelets intercalated with metal ions selected from the group consisting of Cr, Sn, Zn and mixtures thereof around and within intimately disposed the mica.

8. The mica tape of claim 7, where the insulating resin can be cross linked to form polymers around or within the mica and nanoclay materials.

9. The mica tape of claim 1, wrapped around an electrically conducting member.

10. The mica tape of claim 9, applied to a thickness of up to 0.063 cm, said tape having a voltage endurance greater than 1000 hours at 7.5 Kv/mm.

11. The mica tape of claim 1, wrapped around a metal coil.

12. A method of making a flexible electrically insulating mica tape suitable for use as an electrical insulation, comprising the steps of:

(A) providing a mixture of mica, liquid resin and ions selected from the group consisting of Cr, Sn, Zn and mixtures thereof;

(B) applying the mixture to a backing so that a mica matrix forms on and bonds to the backing where the resin and metal ions are intimately disposed adjacent to the mica;
(C) wrapping the mica tape around an electrical conductor; and
(D) curing the resin.

13. The method of claim 12, wherein the mica of step (A) is mica silicates.

14. The method of claim 12, where nanoclay platelets intercalated with metal ions are also present in the mixture of step (A).

* * * * *